DATA SYSTEM MICROPROGRAMMING CONTROL

Filed June 20, 1966 19 Sheets-Sheet 1

INVENTOR
DONALD E. WALLIS

BY [signature]
AGENT

DATA SYSTEM MICROPROGRAMMING CONTROL

Filed June 20, 1966 19 Sheets-Sheet 5

DATA SYSTEM MICROPROGRAMMING CONTROL
Filed June 20, 1966 19 Sheets-Sheet 8
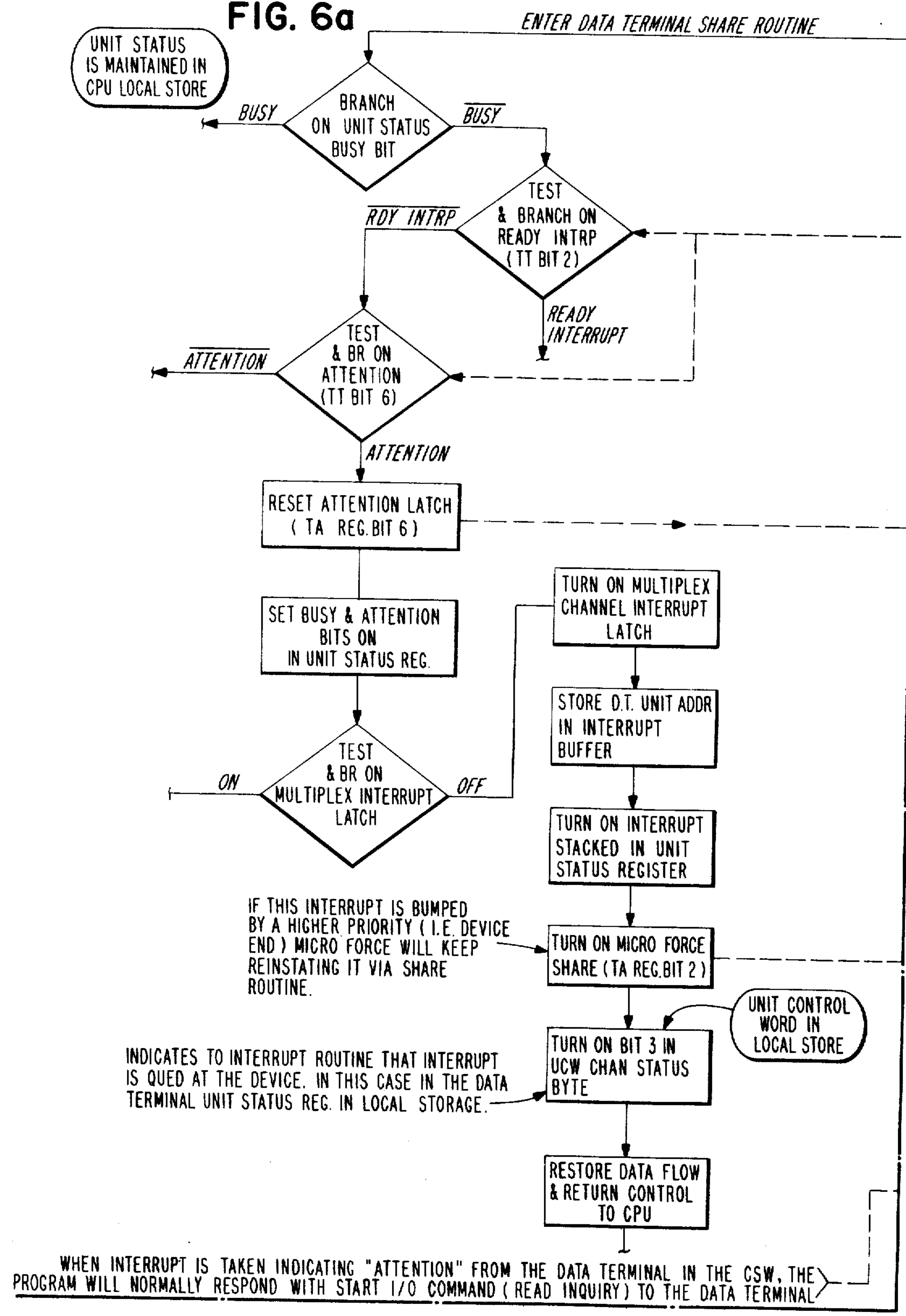

DATA SYSTEM MICROPROGRAMMING CONTROL
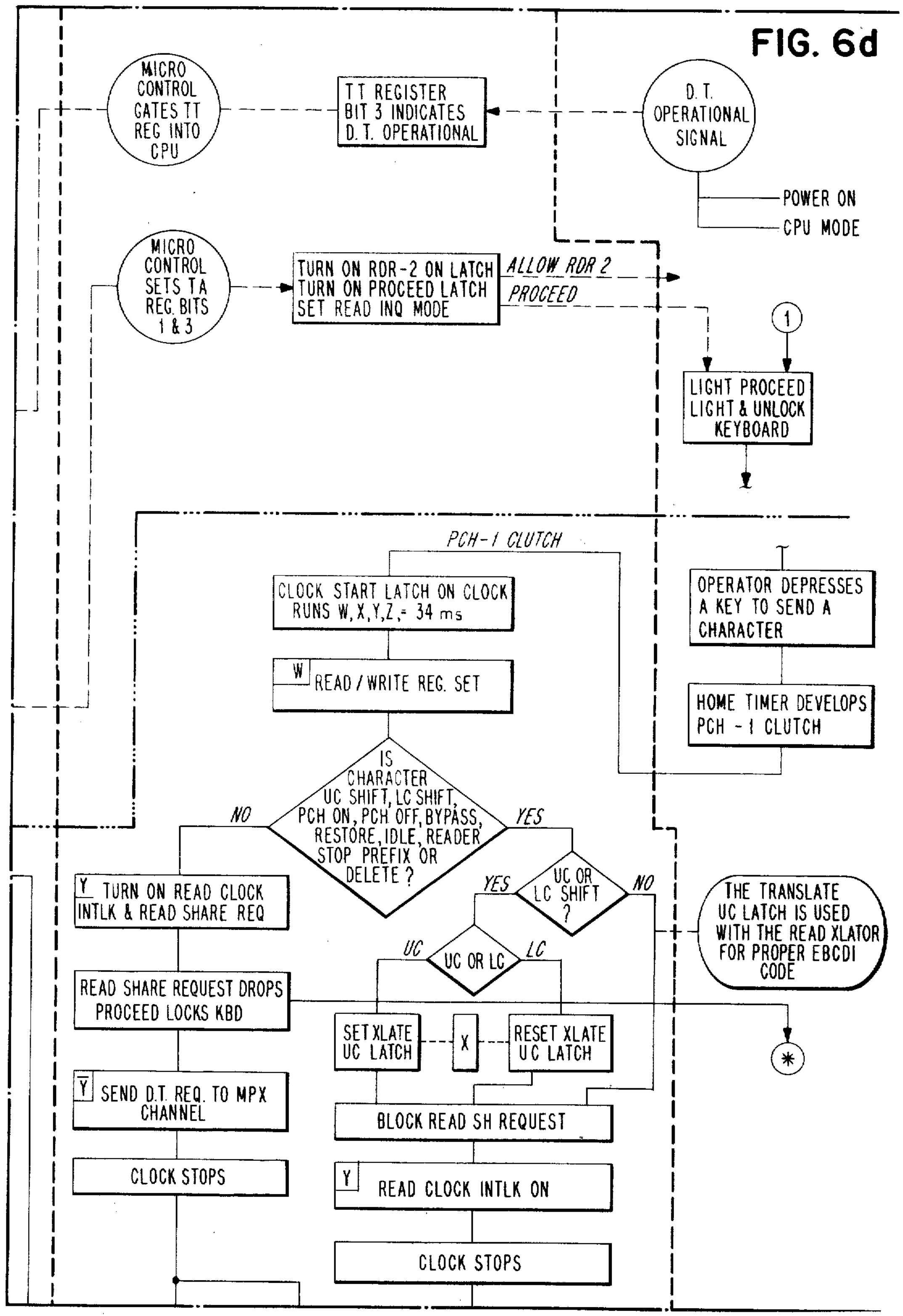

DATA SYSTEM MICROPROGRAMMING CONTROL

Filed June 20, 1966 19 Sheets-Sheet 13

United States Patent Office 3,500,328
Patented Mar. 10, 1970

3,500,328

DATA SYSTEM MICROPROGRAMMING CONTROL

Donald E. Wallis, Endicott, N.Y., assignor to International Business Machines Corporation, Armonk, N.Y., a corporation of New York Filed June 20, 1966, Ser. No. 558,882
Int. Cl. G06f *3/00, 3/04*
U.S. Cl. 340—172.5 5 Claims

ABSTRACT OF THE DISCLOSURE

A direct and unique microprogram control of one or more remote terminal data communication systems in such a manner that the controlling microprogram simulates an equivalent multiplexor device with standard hardware within a central processing unit. The central processing unit is provided with a device level interface that is directly connected with the controlling microprogram and has the equivalent of channel, control unit and device level information in control directly accessible to it at essentially the same time and assumes a double role of both channel and control unit. The remote terminal microprograms transform all input status and sense information to the central processing unit into a format compatible with that produced by a normal multiplexor. The remote terminal microprograms accept standard I/O instructions and formats and execute direct device level control.

The present invention is directed to a system for microprogramming the data flow to and from an input/output data terminal to a central processing unit. In particular, the present invention is directed to a system for microprogramming as a direct device level control functioning as an equivalent of a channel control unit for controlling the data flow between an input/output data terminal and a central processing unit.

The modern trend in data processing systems has been toward a range of computers which have a comprehensive range of computing versatility and compatibility as required by the many modern challenges of industry and science. In the prior art of data processing one of the problems has been a feeding of source data into the data processing equipment. Now data processing systems have been developed in which a centrally located processing unit is capable of exchanging information with a plurality of remotely located terminal units on a selective basis. In order to achieve maximum flexibility of control and selectivity, the use of microprogramming has been widely adopted. A data processing system making use of such microprogramming is shown in a co-pending application of the same assignee entitled "Data Processing System," Ser. No. 357,327, filed Apr. 6, 1964, by G. M. Amdahl et al. In this data process system, a multiplexor channel is basically microprogram controlled and wherein the data flows are all executed by a channel microprogram control.

It is a primary object of this invention to provide a unique microprogrammed attachment which simulates normal multiplexor channel operations.

It is a further object of this invention to provide a direct and unique microprogram control for a remote terminal system operating in conjunction with a central processing unit.

It is another object of this invention to provide a microprogram control which enables modular selection and expandability to include various input/output equipment units.

It is still a further object of the invention to provide a direct input/output device attachment to allow the controlling microprogram to simulate the usual input/output device attachments.

Briefly, the present invention is concerned with a direct and unique microprogram control of one or more remote terminal data communication systems in such a manner that the controlling microprogram simulates an equivalent multiplexor device with standard hardware within a central processing unit. In other words, the central processing unit in accordance with the present invention is provided with a device level interface that is directly connected with the controlling microprogram and has the equivalent of channel, control unit, and device level information in control directly accessable to it at essentially the same time and assumes the double role of both channel and control unit. The remote terminal microprograms transform all input status and sense information to the central processing unit into a format compatible with that produced by a normal multiplexor channel. The remote terminal microprograms accept standard I/O instructions and formats and execute direct device level control.

The foregoing and other objects, features and advantages of the invention will be apparent from the following more particular description of a preferred embodiment of the invention, as illustrated in the accompanying drawings.

FIG. 3*a* through 3*d* form a schematic diagram of the data flow and microprogram controls for the data transfer system.

Figure 3:
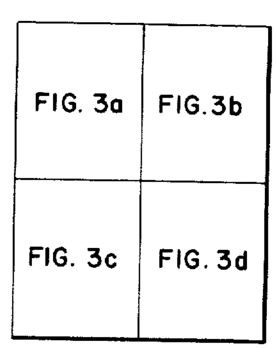

FIG. 3 is a diagram showing the manner in which FIGS. 3*a* through 3*d* should be joined together.

Figure 4:
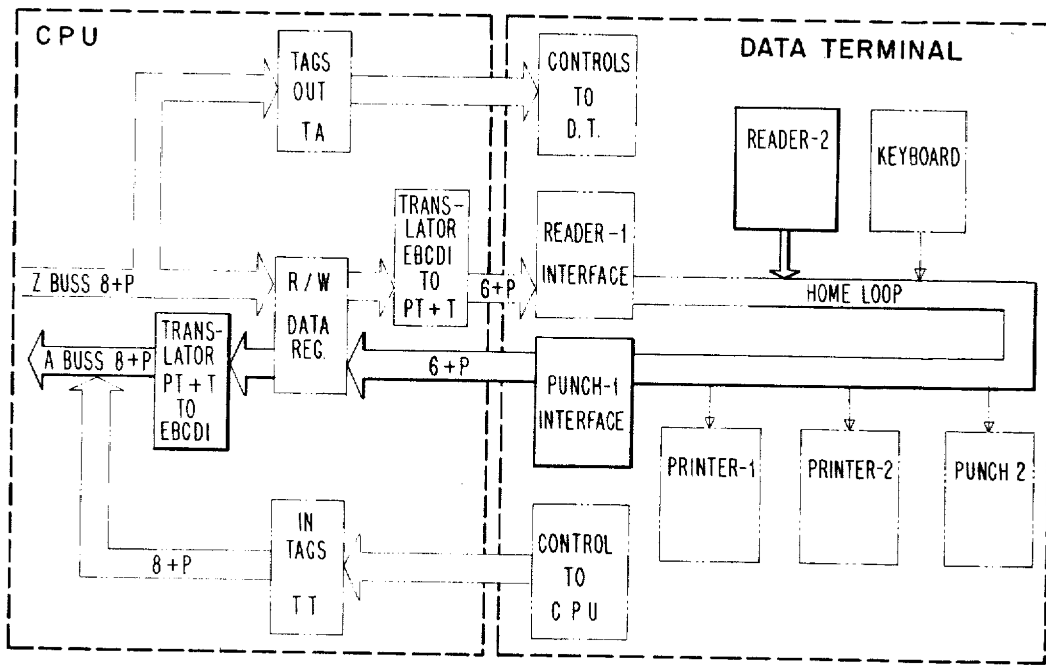

FIG. 4 is a schematic data flow diagram for equipment used in a data reading operation.

Figure 5:
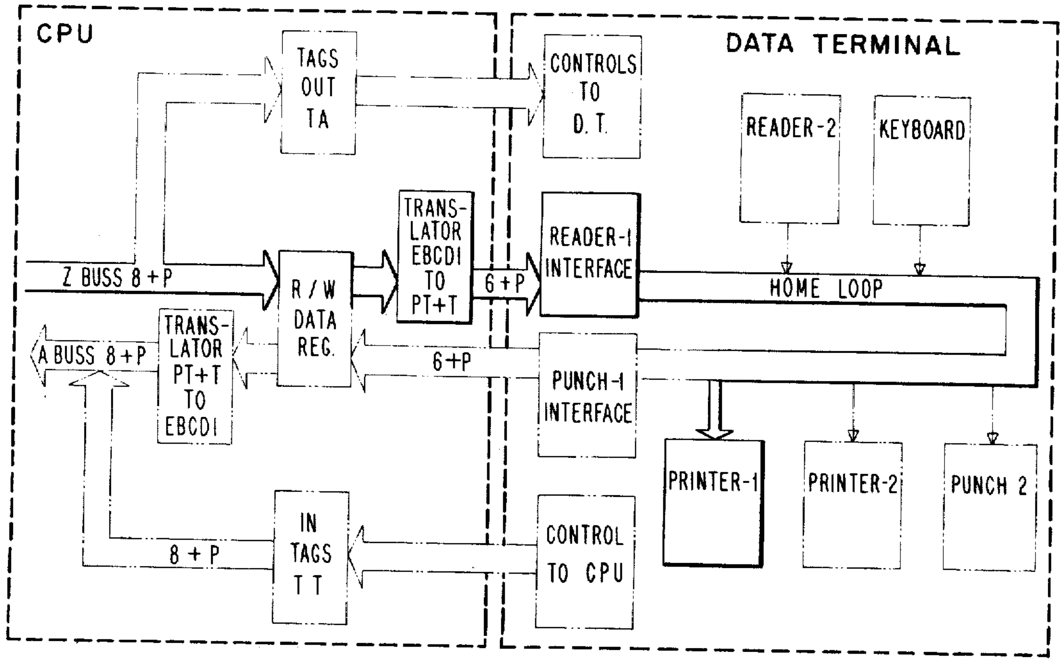
Figure 6B:
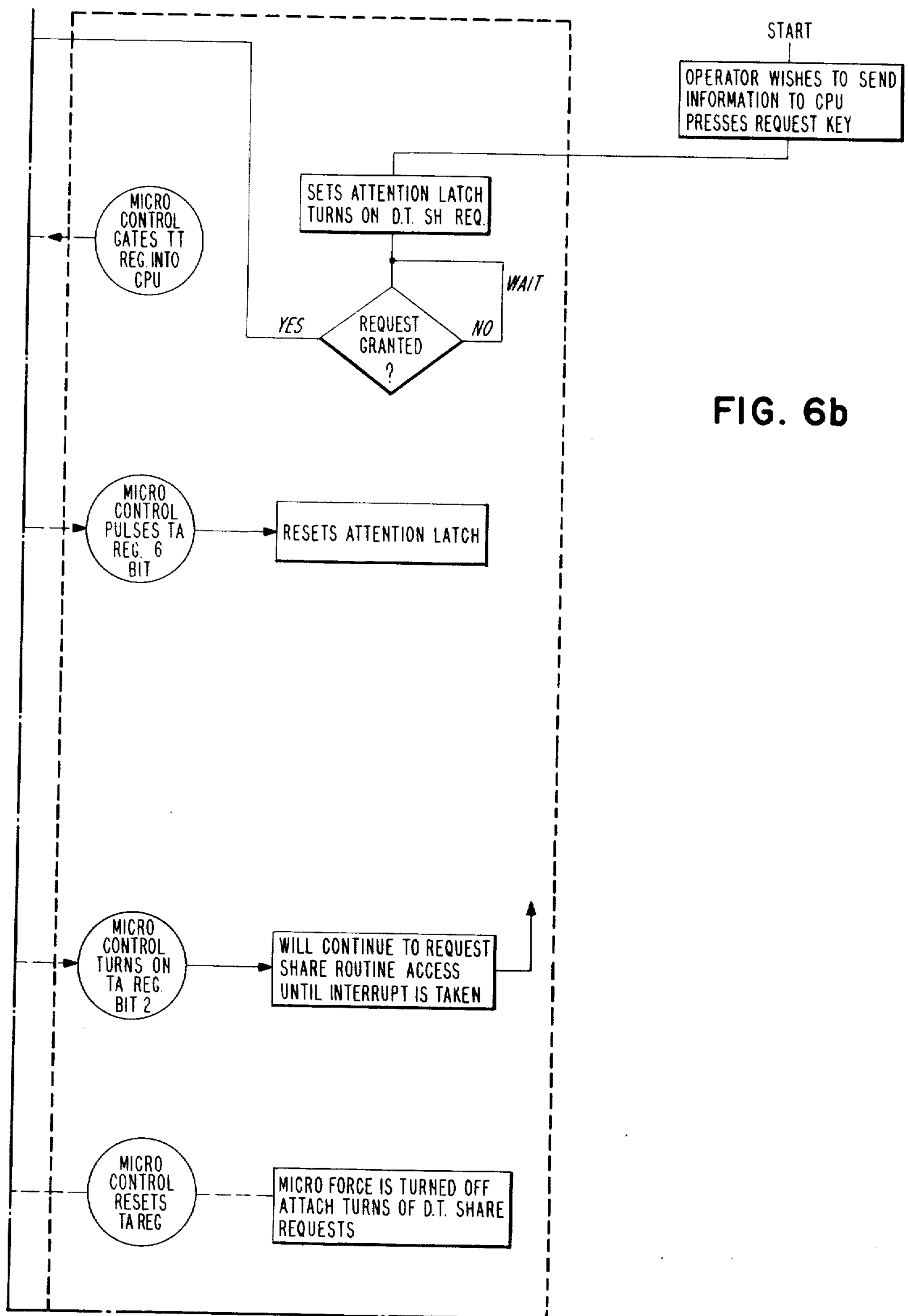
Figure 6C:
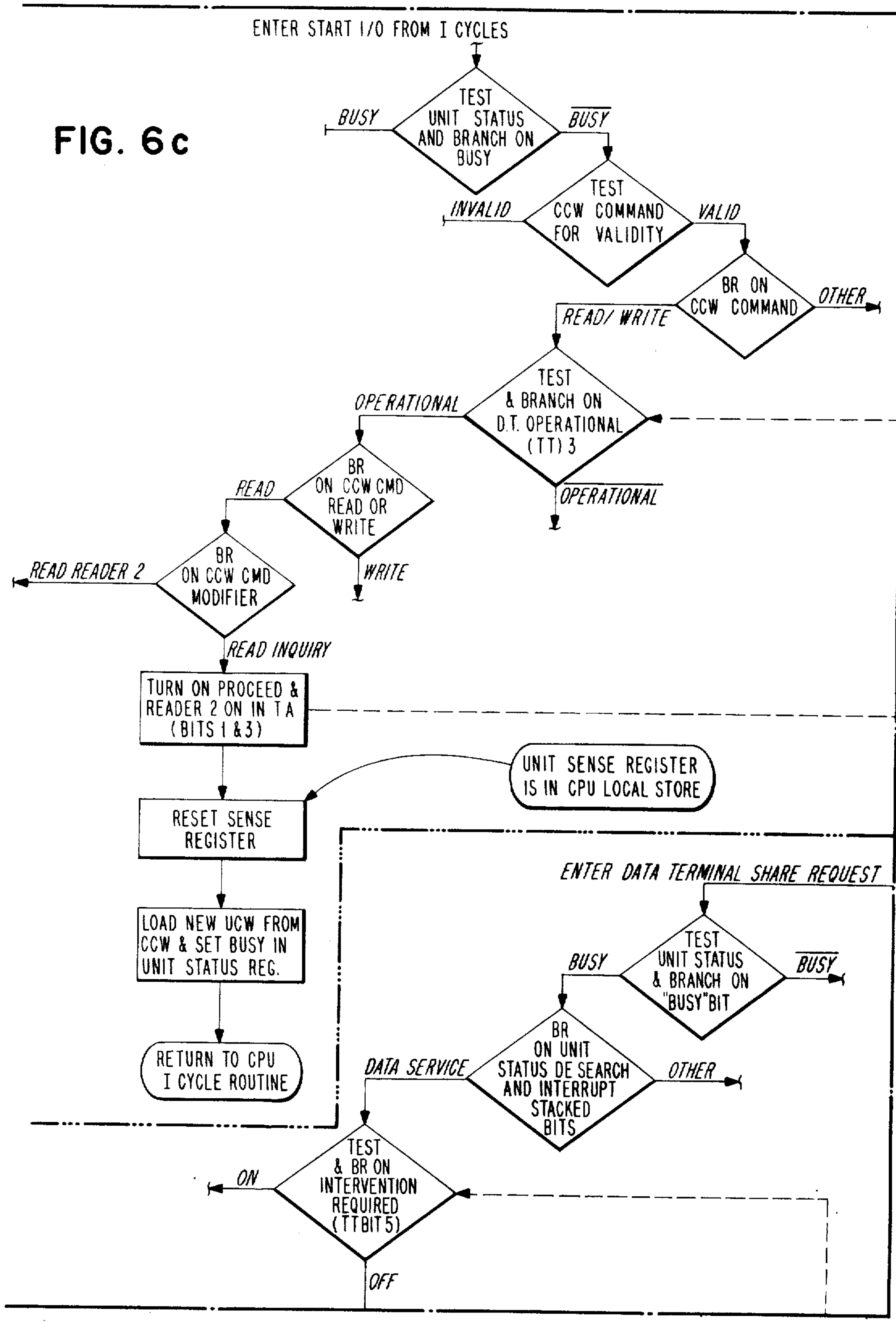
Figure 6E:
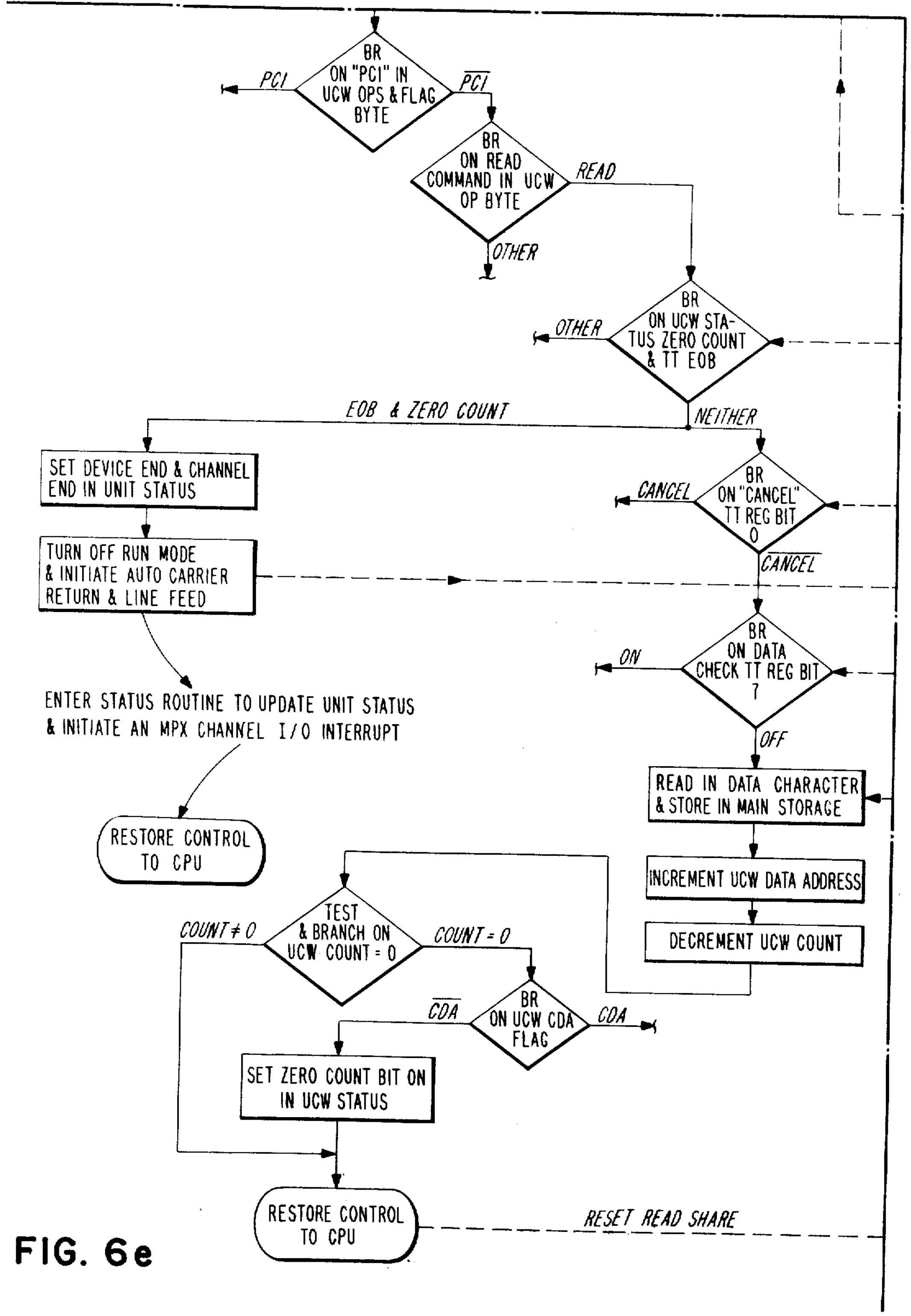
Figure 6F:
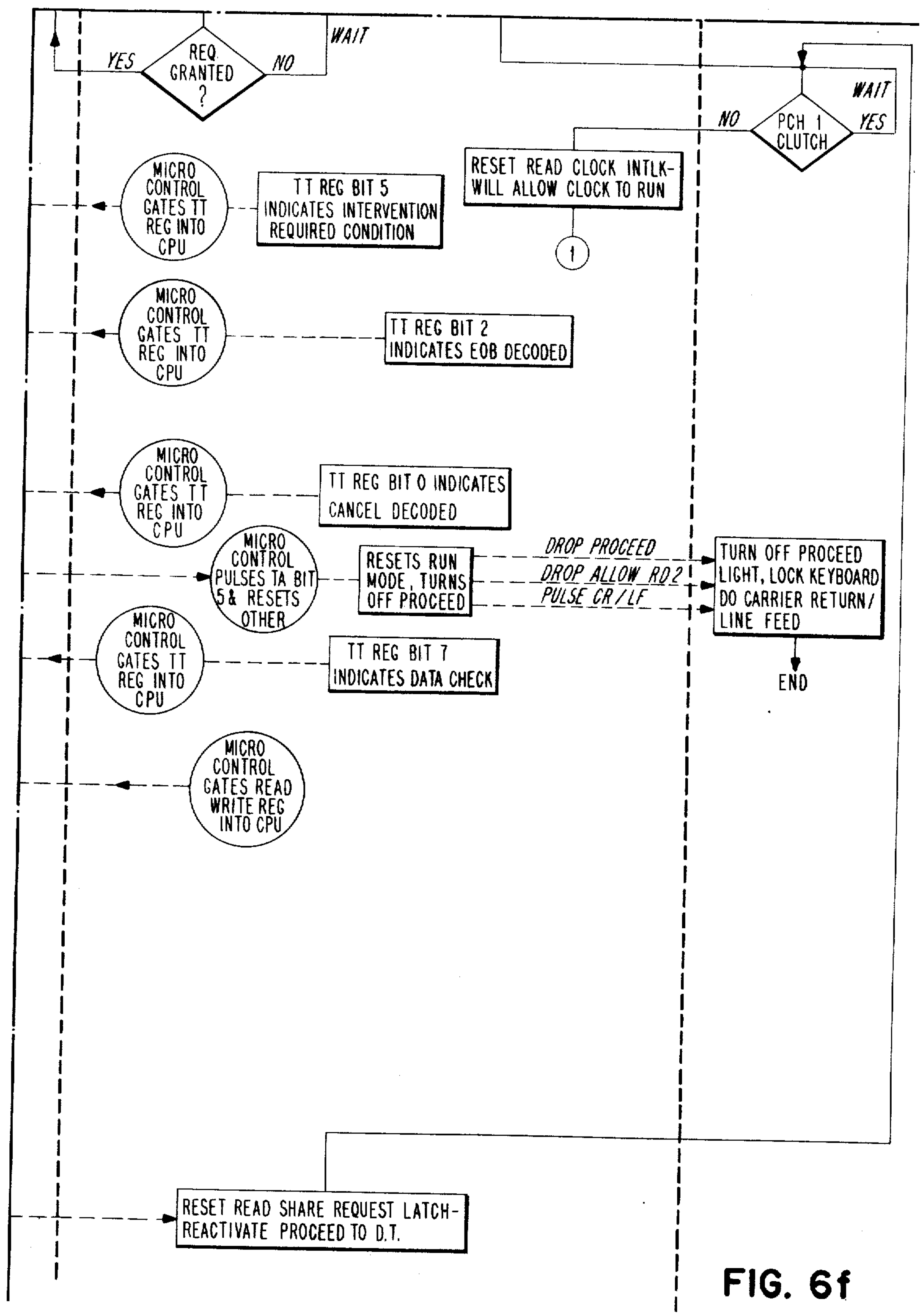
Figure 7A:
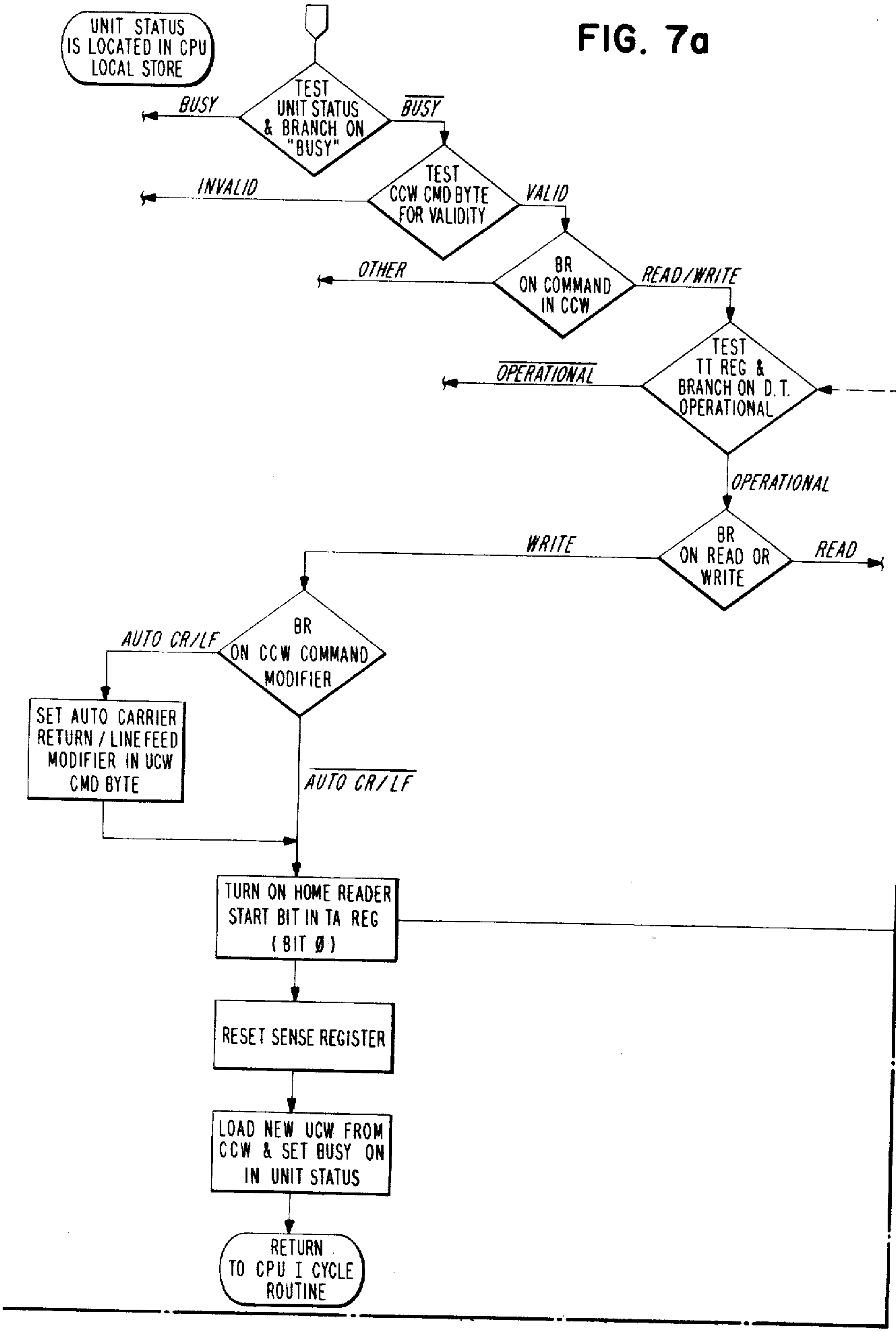
Figure 7B:
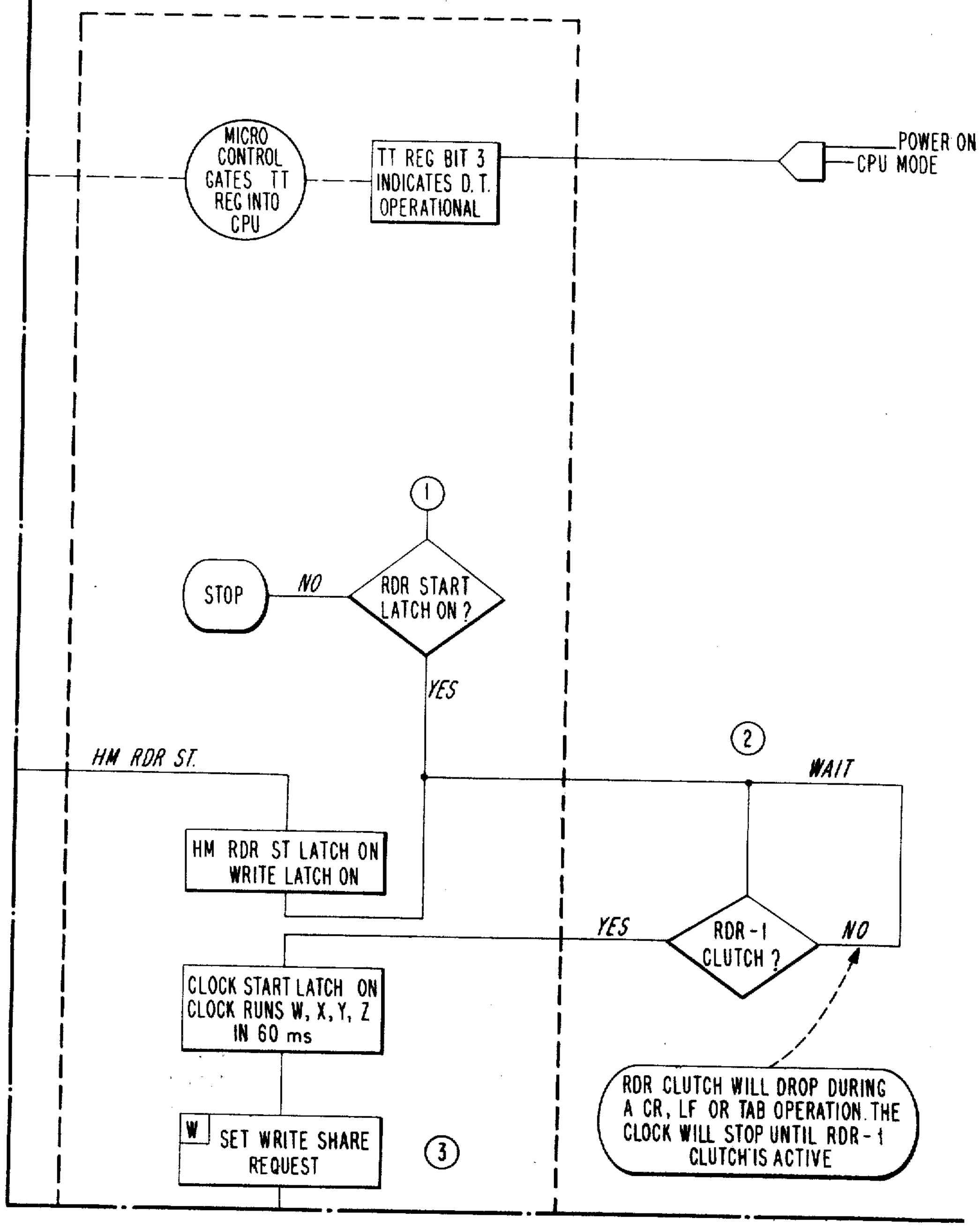
Figure 7C:
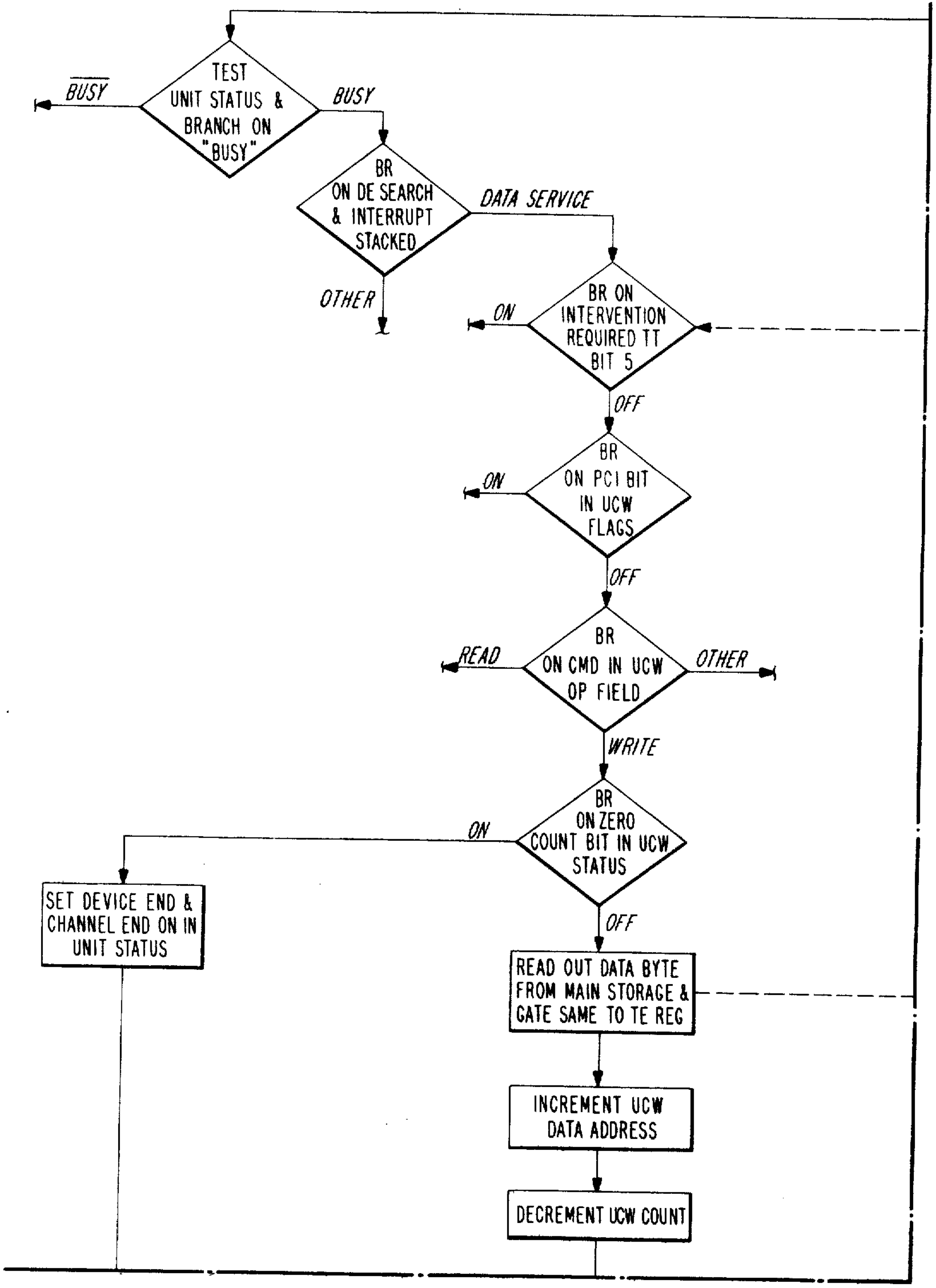
Figure 7D:
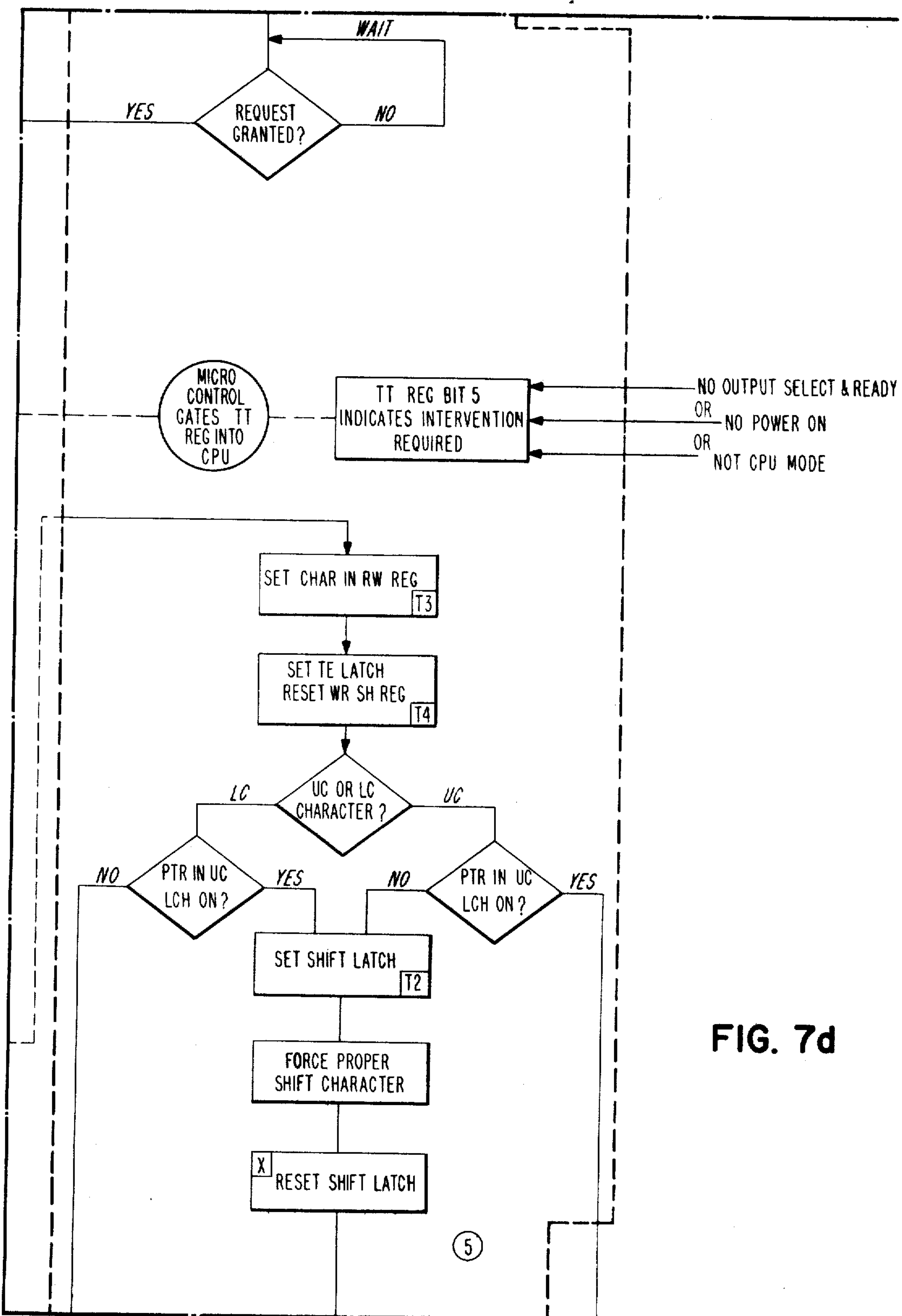
Figure 7E:
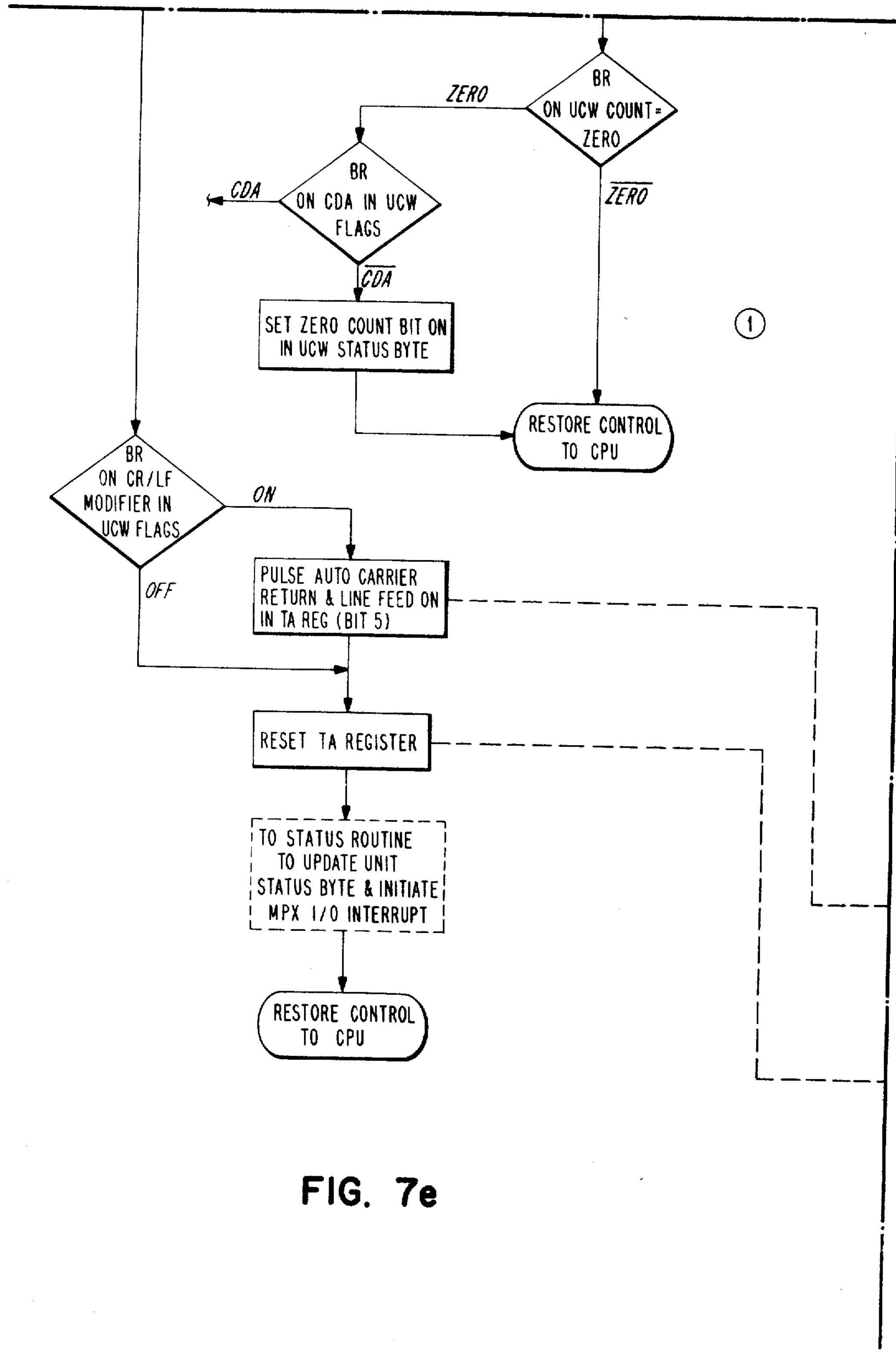
Figure 7F:
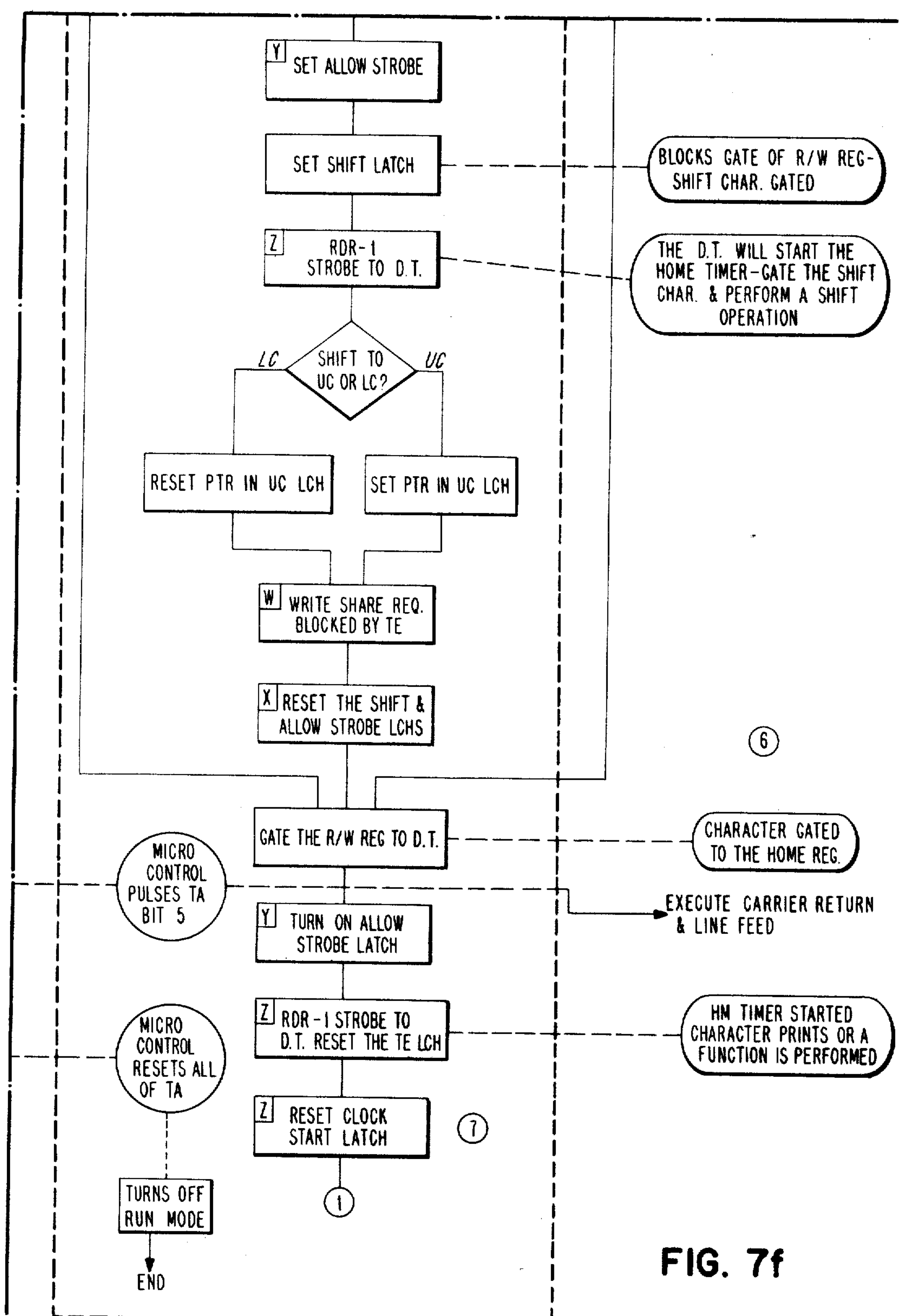

FIG. 5 is a schematic data flow diagram for equipment used in a data write operation.

FIGS. 6*a* through 6*f* are a chart showing the microprogram control sequences for a data read operation.

Figure 6:
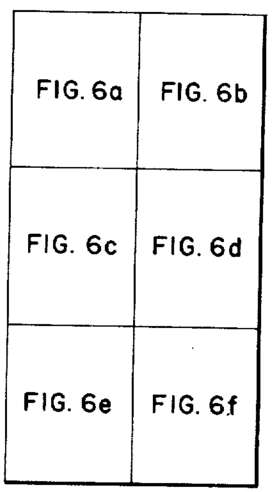

FIG. 6 is a diagram showing the manner in which FIGS. 6*a* through 6*f* should be joined together.

FIGS. 7*a* through 7*f* are a chart showing the microprogram control sequences for a data write operation.

Figure 7:
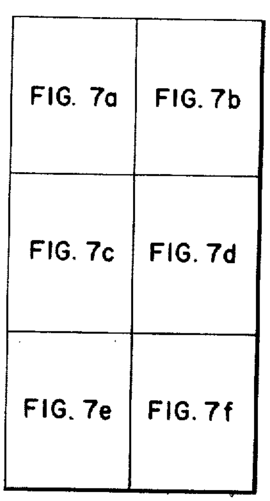

FIG. 7 is a diagram showing the manner in which FIGS. 7*a* through 7*f* should be joined together.

Figure 1:
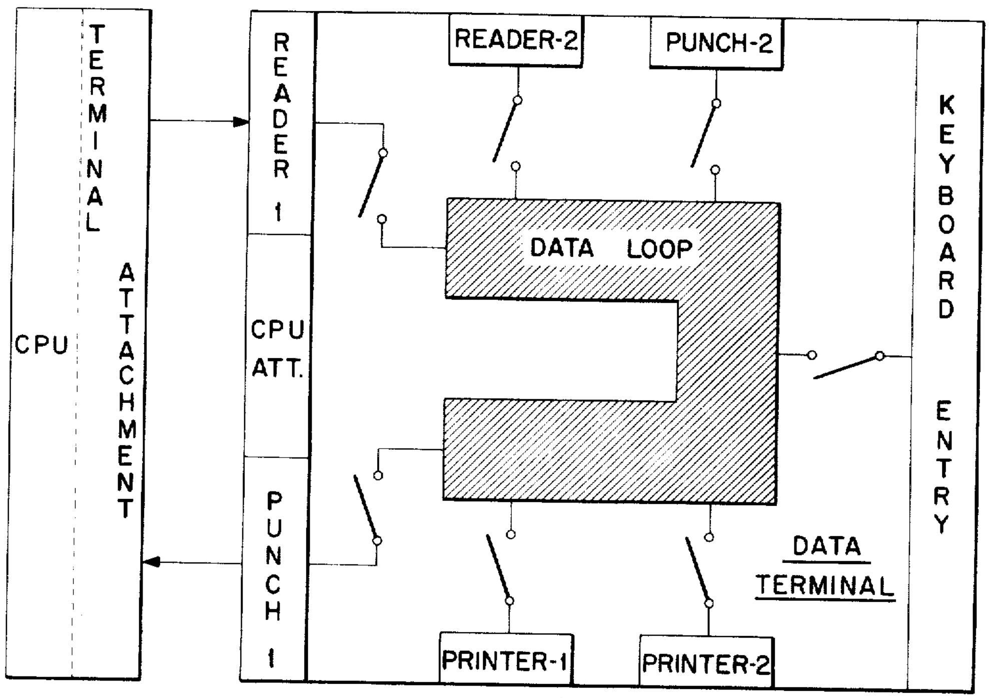
FIG. 1 is a schematic showing of the over-all system configuration.

In FIG. 1 there is shown a basic system structure for a data processing system comprising a central processing unit (CPU) operating in conjunction with a remote data terminal (DT) which operates as an input/output (I/O) device to the CPU. The remote DT is coupled with the CPU through a terminal attachment control. The CPU includes main storage units and the facilities for addressing main storage, for retrieving or storing information, for arithmetic and logical processing of data, for sequencing instructions in the desired order, and for initiating the communication between storage and external devices.

In the main storage device is contained a plurality of addressable data locations for the data being handled. A plurality of registers, settable to indicate a byte (8 bits) of data, are contained in the CPU to provide address selection of indicated byte locations in the storage device. Temporary single byte status devices to indicate conditions within the machine and control subsequent operations and temporary storage buffers to register data bytes prior to, or during, or after a manipulation of this data within some arithmetical logical or input/output operation. Instructions and data are contained in the main storage area and from these instructions, the machine is controlled to manipulate data to accomplish all the functions for which the data processing machine is designed. In operation, instructions are read out of the main storage device in a series of instruction cycles and the data in the instruction were stored in a register contained within the machine as indicated by the operation to be performed.

Input/output operations involve the transfer of information to or from main storage and an input/output device. Input/output devices include such equipments as card readers, card punches, paper tape units, magnetic tape units, bit or drum storage devices, typewriter-keyboard devices, printers, teleprocessing devices, and process control equipment.

Many I/O devices function with an external document, such as a punched card or a reel of magnetic tape. Some I/O devices handle only electrical signals such as those found in process-control networks. In any event, I/O device operation is regulated by a control unit. The control-unit function may be housed with the I/O device or a separate control unit may be used. In all cases the control-unit function provides the logical and buffering capabilities necessary to operate the associated I/O device. From a programming point of view, most control-unit functions merge with I/O device functons. Each control unit functions only with the I/O device for which it is designed and each control unit has standard signal connections with regard to the data communication channel to which it is attached.

The data terminal is programmed and operates similar to an equivalent device on a multiplexor channel. The microprogram or the data terminal is similar to a multiplex channel program in theory. However, because of the actual hardware used in the attachment differs from a channel control, a unique microprogram is used to handle the data flow.

The attachment of a data terminal to the CPU is on a native interface. This means that all the controls and connecting lines to adapt the data terminal are located in the CPU, or are native to it.

Data sent to and from the data terminal will be in the PTT code/8 (perforated tape and transmission). The data terminal system operates with the PTT/8 code and translation to and from this code is handled in the CPU-terminal attachment. The PTT/8 code is made up of the standard BCD bits C, B, A, 8, 4, 2, and 1. The C-bit is used to maintain odd parity. This standard code may be shifted to provide upper and lower case and thereby give more possible code combinations.

Data from the data terminal DT will be stored in the CPU using an EBCDI code (extended binary-coded decimal interchange). The EBCDI code is used to store data within the CPU or send data to the data terminal. Translation is necessary to convert the PTT/8 code to EBCDI and conversely. PTT/8 code combinations are translated on input to the CPU and EBCDI code combinations are translated on output from the CPU to the data terminal.

While in the preferred embodiment the operation of the system has been explained through the use of the PTT/8 code and the EBCDI code, it should be understood that other code forms of data representation may be used without departing from the spirit of the invention.

The means for connecting the CPU to the data terminal is called an interface and contains four basic sections, namely, the read attachment, the write attachment, controls to and from the data terminal, and the voltage lines and emergency power off.

A reader and a punch attachment in the data terminal provide the data interface with the CPU. The read bus is used to send data from the data terminal to the CPU via the punch attachment in the data terminal and contains the seven bit lines and necessary controls for transmitting the data to the CPU.

The write bus portion of the interface is used to send data from the CPU to the data terminal via the reader attachment. The CPU will use this attachment when sending data to the data terminal. In fact, the CPU will appear in function like a reader to the data terminal control.

Many control lines are necessary on the interface to transmit control signals to and from the data terminal. Basically, in a write mode, these controls are used to prevent the CPU from running at a faster rate than the data terminal. Likewise, during a read mode, the data terminal is interlocked so as to prevent it from running faster than the CPU program.

Figure 2:
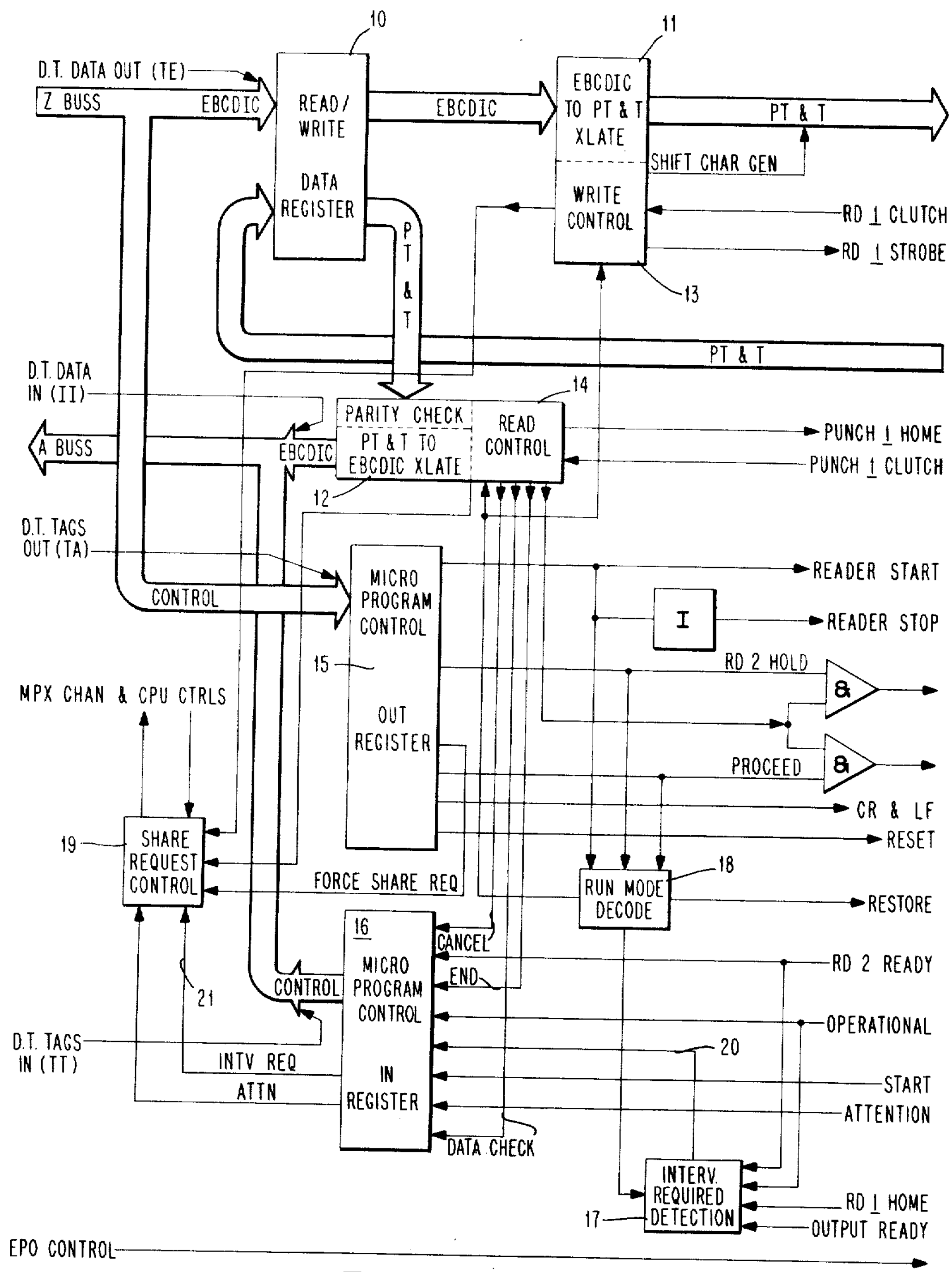
FIG. 2 is a schematic data flow and controls diagram for the terminal attachment of a central processing unit shown in FIG. 1.
Figure 3A:
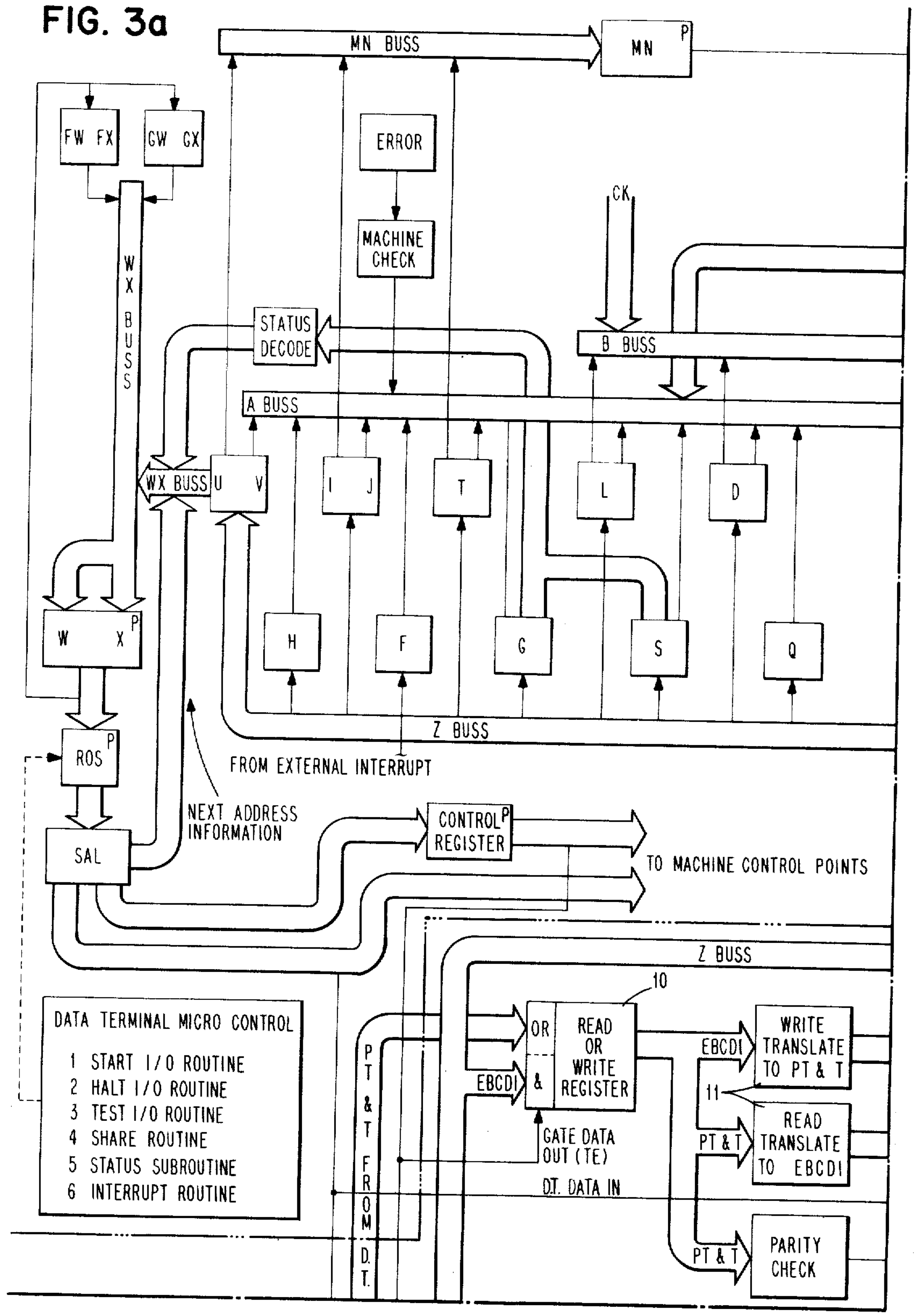
Figure 3B:
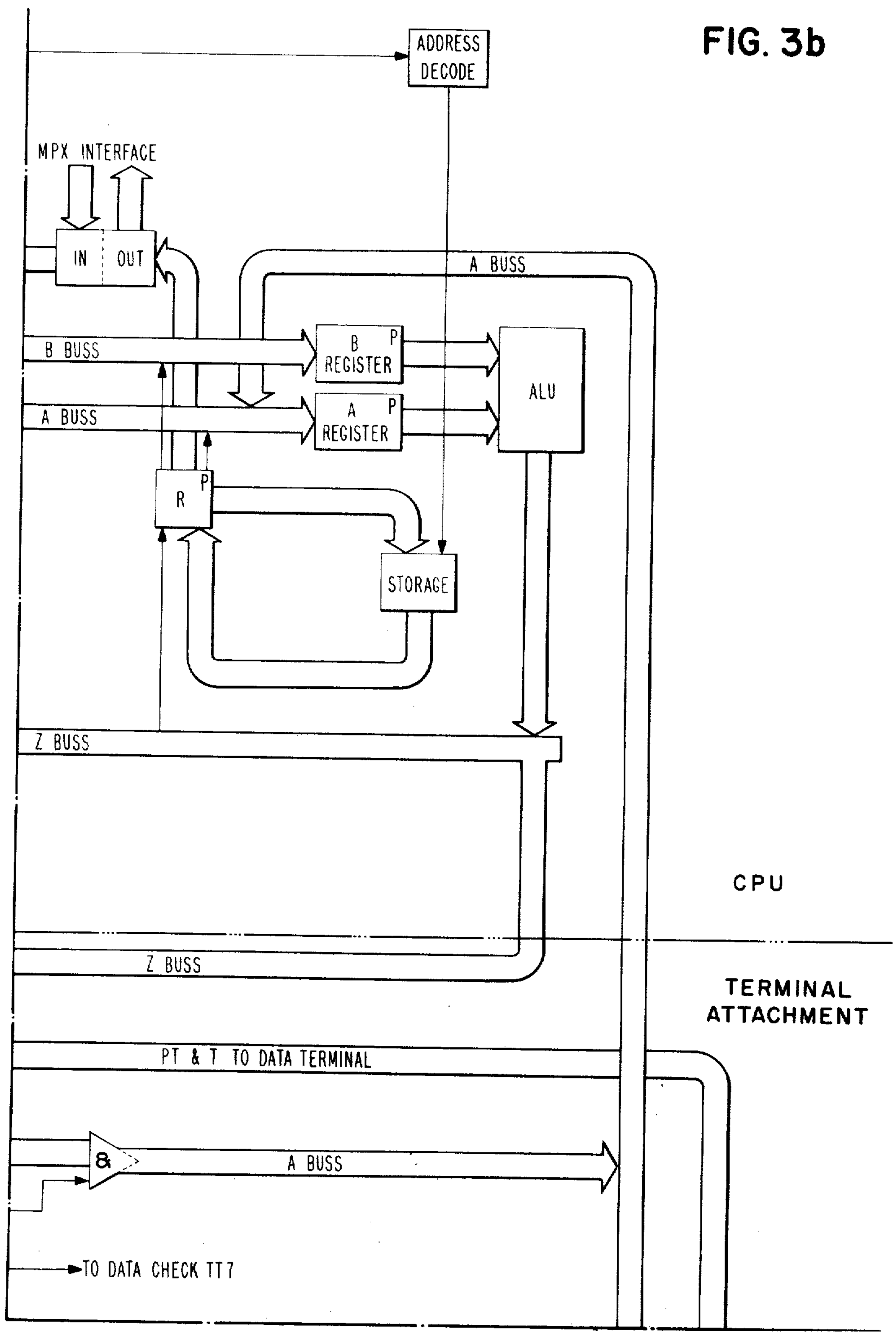
Figure 3C:
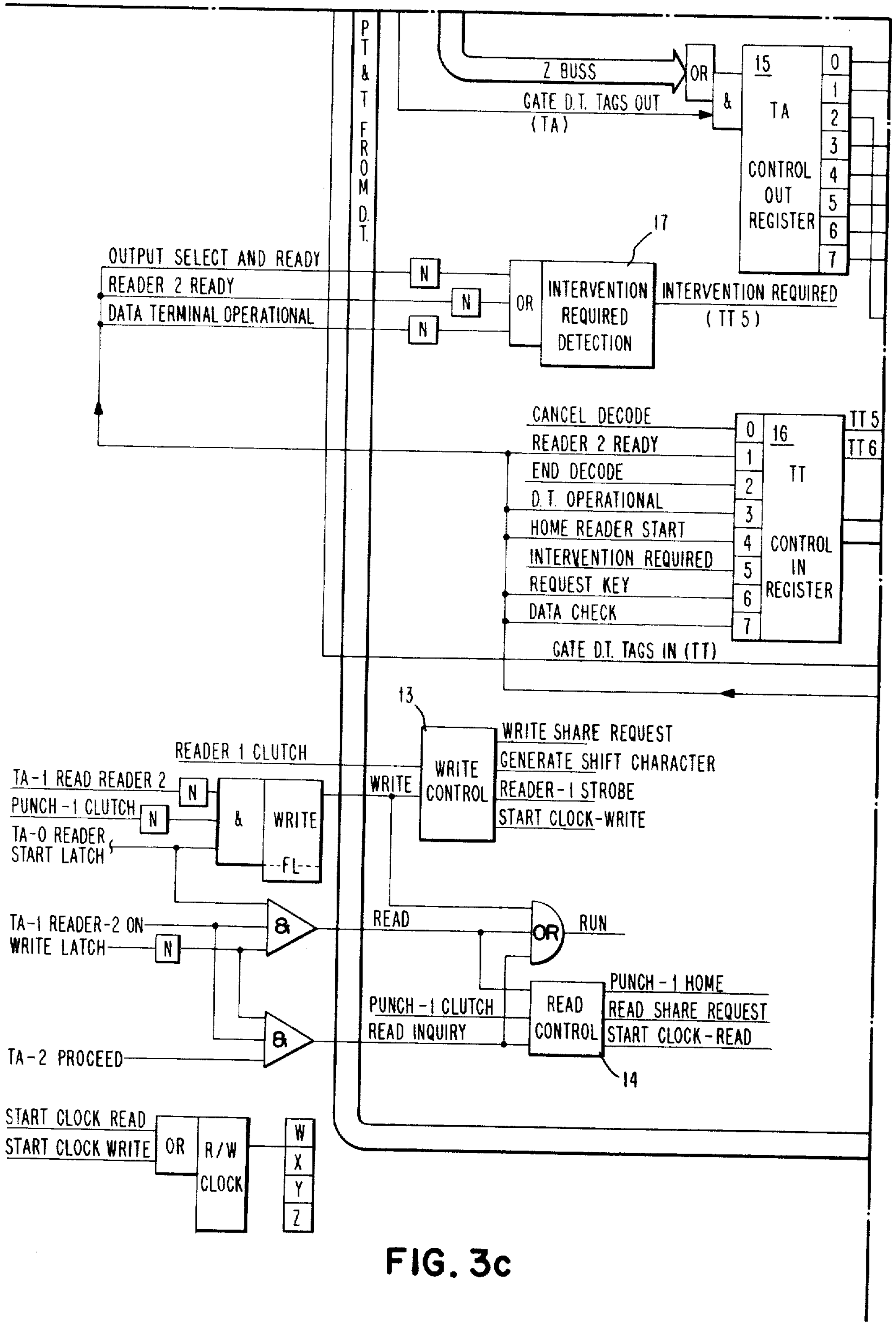
Figure 3D:
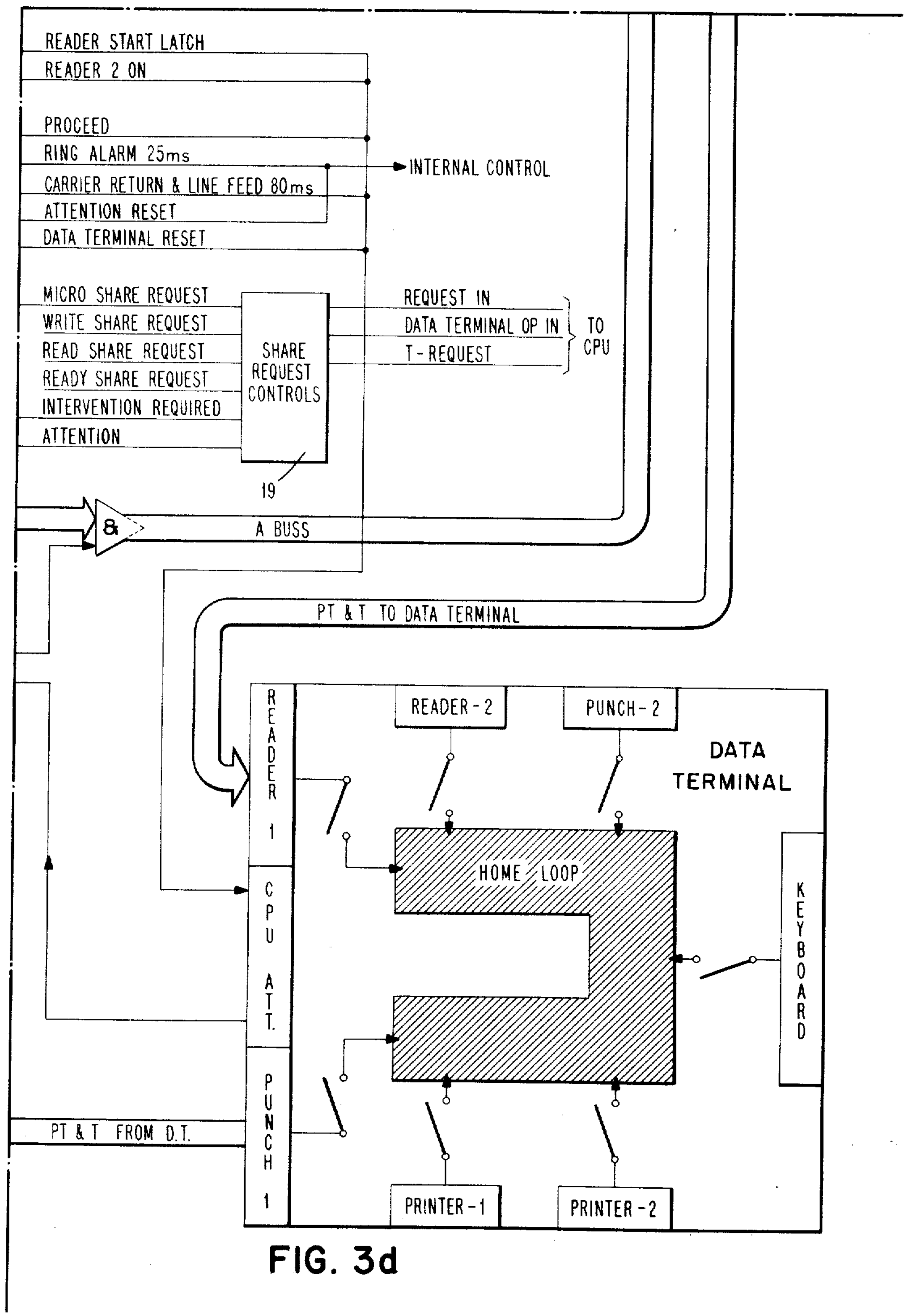

Referring to FIG. 2, there is shown a schematic data flow diagram for the terminal attachment of the central processing unit CPU shown in FIG. 1. The terminal attachment comprises the read-write register 10, the code translators 11 and 12, the write control 13, the read control 14, the microprogram control out register 15, the microprogram control in register 16, the intervention required detection unit 17, the run mode decoded unit 18, and the share request control unit 19. The read-write data register 10 is a nine-bit latch type register which buffers each EBCDIC character received from the CPU prior to translation to the PTT/8 code during write and transfer operations to the data terminal (DT). The read-write data register also buffers each PTT/8 code character received from the data terminal prior to translation to the EBCDIC during a read operation. Translator 11 functions to convert the EBCDIC code to PTT/8 code during write operations. The translator 12 functions to convert the PTT/8 to EBCDIC codes for transfer to the CPU during read operations.

The write controls 13, upon recognizing write-run mode conditions, controls the write process and performs the following major functions: (1) initiates write share requests to obtain data characters from storage via the data terminal share microprogram; (2) regulates the flow of data to the data terminal; (3) recognizes upper case/lower case data translations and generates shift characters for transfer to the data terminal; and (4) monitors the read-clutch signal from the data terminal so as to interlock the writing during extended data terminal mechanical cycles, namely, carrier return, tab, and the like.

The read control unit 14, upon recognizing a read inquiry or read run mode condition, controls the read process and performs the following major functions: (1) initiates read-share requests to transfer input data from the data terminal to storage via the data terminal share microprogram; (2) requlates the flow of input data from the data terminal to prevent data overrun by controlling the reader 2 hold interlock or the keyboard proceed interlock; (3) decodes cancel and EOB (End of Block)/EOT (End of Transmission) to microprogram inbound controls Cancel and End, detects and bypasses PTT/8 control characters which are not to be transferred into storage, detects and performs shift control for the PTT/8 to EBCDIC translator 12.

The microprogram control out register 15 and the microprogram control in register 16 are the controlling links between the data terminal microprogram and the terminal attachment. The character bit patterns set into the control-out register 15 by the data terminal microprogram perform the following major functions: (1) initiates and terminates the various run modes in the terminal attachment and the data terminal; (2) performs direct data terminal control functions such as a carrier return, line feed, or reset operation, and (3) forces share requests for handling stacked interrupt conditions. The microprogram controls in 16 provides data terminal and terminal attachment inbound control and condition information to the data terminal microprograms.

The intervention required detection unit 17 continuously checks for intervention required conditions. When such a condition is detected a signal is sent via line 20 to the microprogram control in register 16 which in turn will activate the share request control unit 19. The following are intervention required conditions:

INTERVENTION REQUIRED CONDITIONS

| Run Mode | Conditions | | | |
|---|---|---|---|---|
| | DT Not Operational or Attachment in CR Mode | RDR 1 Not Home | Output Not Select and Ready | RDR 2 Not Select and Ready |
| Write | X | X | X | |
| Read RDR 2 | X | X | | X |
| Read Inq. (KB) | X | X | | |
| Read Inq. (RDR 2) | X | X | | X |

The run mode decode unit 18 functions to initiate and terminate the run mode by decoding specific microprogram control out signals. Certain run modes when decoded generate the initiating functional controls to the data terminal DT. The run mode decode and generated initializing functions are shown in the following chart:

| Mode | | | | | Initializing Functions Generated | | |
|---|---|---|---|---|---|---|---|
| | RDR Start | Proceed | Allow RD 2 | DT Reset* | Carrier Return & Line Feed | Punch 1 Home | Restore* |
| Write | X | | | | | | X |
| Read RDR 2 | X | | X | | | X | X |
| Read Inq | | X | X | | | X | X |
| Idle & Avail | | | | X | [1] X (a) | | |

* = pulses, all others are signal levels.
[1] Except when terminating a write without auto carrier return and line feed.

The share request controls unit 19 determines internal data terminal DT share request conditions and priorities, and establishes the required multiplexor channel share entries and a unique data terminal share request signal for the main multiplex share routine to branch on. The data terminal attachment can be selectively assigned in terms of multiplexor channel select out polling priority. The following are the six major share request conditions:

| Share request: | Function |
|---|---|
| Read | A character has been received from the DT and is in the Read/Write data register. |
| Write | The last character in the Read/Write data register has been sent to the DT and the next character from the storage is requested. |
| Micro - force - share request | The DT microprogram has queued an interrupt condition. |
| Intervention-required | Intervention required has been detected. |
| Attention | The DT request key has been depressed and the attachment is idle and available. |
| DT ready | The DT has gone from a not ready (or off line) to a ready (or on line) condition. |

Referring to FIGS. 3*a* through 3*d*, there is shown a schematic diagram of the data flow and microprogram controls for the data transfer between a central processing unit and peripheral input/output devices. FIG. 3 shows the manner in which FIGS. 3*a* through 3*d* should be joined. Only those portions of the CPU which are essential to the operation of the preferred embodiment of the data transfer system are shown in the schematic diagram. The CPU utilizes eight-bit registers, which are connected to a system of data transfer buses, and an arithmetical logical unit ALU capable of handling two eight-bit inputs at a time. The basic data-flow registers have the following designations and functions:

| Name: | Usual function |
|---|---|
| I, J, U, V, and T | Address registers. |
| M, N | Main address registers. |
| L | Holds length of data field. |
| D | General-purpose data register. |
| R | Data storage register. |
| G and S | Status registers: retain machine conditions and status for testing by the microprogram control routines. |
| H | Priority status register. |
| A | A-entry to the adder. |
| B | B-entry to the adder. |
| F | External interrupt register (console interrupt section standard). |
| Q | Storage protection key (special feature). |
| W, X | Read-only storage address registers. |
| FW, FX | Read-only storage address registers for selector channel one (special feature) operations. |
| GW, GX | Read-only-storage address registers for selector channel two (special feature) operations. |

These registers, the arithmetic and logical units ALU, and the data transfer buses are manipulated by the control elements, and the read-only-storage microprogram during instruction execution.

The terminal attachment controls are the same as those explained above in conjunction with a reference to FIG. 2. The data terminals DT are shown on the lower portion of FIG. 3*d* and are shown to comprise a printer keyboard, two printers, a reader which may be either card or paper tape, and a punch which may be either card or paper tape. Communication betwen a data terminal operator and the program is effected through the keyboard. A variety of console devices at the data terminal is also usable to increase the flexibility of the data transfer system.

Briefly, to perform the functions of an operation OP code, such as move, add, or branch, requires that the CPU initiate a sequence of logical steps. This group of steps in the system of the preferred embodiment is called the microprogram. Within the microprogram, a Read-Only-Storage word is the functional statement. An OP code is read from main storage by an address initiated in the Read-Only-Storage Address Register of the CPU. When the address ROS word is read, its contents are decoded to activate control points within the system. An ROS word consists of specific fields selected or programmed to perform a logic statement. The activated word also sends back next address information to the ROAR. Coupled with branch control it forms the address of the next ROS word. To enhance the understanding of the operation of the system of the preferred embodiment, there has been included a diagrammatic showing of the microprogram control sequences for both a data read and a data write operation.

FIG. 4 is a schematic data flow diagram for a data read operation with the principal units used in the read operation shown in solid form and the unused units shown in dotted configuration. FIGS. 6*a* through 6*s* show in chart form the microprogram control sequences for the data read operation.

FIG. 5 is a schematic data flow diagram for a data write operation with the principal units shown in solid notation and the unused devices shown in dotted configuration. FIGS. 7*a* through 7*f* form a chart showing the microprogram control sequences for a data write operation.

While the invention has been particularly shown and described with reference to a preferred embodiment thereof, it will be understood by those skilled in the art that various changes in form and details may be made therein without departing from the spirit and scope of the invention.

What is claimed is:

1. In a system for transferring data between a peripheral data terminal and a central processing unit, data transfer apparatus comprising:

(a) a data register for buffering data characters during data transfer operations between a peripheral data terminal and the central processing unit, (b) write control means for regulating the flow of data to the peripheral data terminal, (c) read control means for regulating the flow of input data from the peripheral data terminal to the central processor unit, (d) a microprogram control register for directly performing peripheral data terminal control functions and data-input transfer control functions, and (e) translators coupled with the output of the data register for converting data characters according to one code configuration into a different code configuration.

2. In a system for transferring data between a peripheral data terminal and a central processing unit, data transfer apparatus comprising:

(a) a data register for buffering data characters during data transfer operations between a peripheral data terminal and the central processing unit, (b) write control means for regulating the flow of data to the peripheral data terminal, (c) read control means for regulating the flow of input data from the peripheral data terminal to the central processor unit, (d) a microprogram control register for directly performing peripheral data terminal control functions and data-input transfer control functions, (e) share request control means responsive to the microprogram control register for controlling the data transfer share routines, (f) a first translator coupled with the output of the data register for converting data characters according to a central processor storage code configuration to a different code configuration for transfer to the peripheral data terminal, and (g) a second translator coupled with the output of the data register for converting data characters received from the peripheral data terminal to a different code configuration for storage within the central processing unit.

3. Data transfer apparatus of claim 2 further including:

(a) a run mode decode unit coupled with the microprogram control register for initiating and terminating data transfer control functions.

4. Data transfer apparatus of claim 3 further including:

(a) an intervention detection unit for determining when sharing conditions are to be established within the data transfer operations.

5. In a system for transferring data between a peripheral data terminal and a central processing unit, data transfer apparatus comprising:

(a) a data register for buffering data characters during data transfer operations between a peripheral data terminal and the central processing unit, (b) write control means responsive to a write run mode signal for controlling a write process and for obtaining data characters from central processing unit storage for transfer to the peripheral data terminal, (c) read control means responsive to a read inquiry signal for controlling a read process and to initiate a data transfer operation for transferring data from a peripheral data terminal into the central processing unit, (d) microprogram control registers for directly performing peripheral data terminal control functions and data-input transfer control functions, (e) share request control means responsive to their microprogram control registers for controlling the data transfer share routines, (f) a first translator coupled with the output of the data register for converting data characters according to a central processor unit storage code configuration to a different code configuration for transfer to the peripheral data terminal, (g) a second translator coupled with the output of the data register for converting data characters received from the peripheral data terminal to a different code configuration for storage within the central processing unit, (h) a run mode decode unit coupled with the microprogram control registers for initiating and terminating data transfer control functions, and (i) an intervention detection unit for determining sharing conditions are to be established within the data transfer operations.

References Cited

UNITED STATES PATENTS

| | | | |
|---|---|---|---|
| 3,337,855 | 8/1967 | Richard et al. | 340—172.5 |
| 3,312,950 | 4/1967 | Hillman et al. | 340—172.5 |
| 3,312,945 | 4/1967 | Berezin et al. | 340—172.5 |
| 3,302,181 | 1/1967 | Lee | 340—172.5 |
| 3,014,654 | 12/1961 | Wilser et al. | 235—61.11 |
| 3,293,612 | 12/1966 | Ling | 340—172.5 |
| 2,988,735 | 6/1961 | Everett et al. | 340—174.1 |
| 2,985,865 | 5/1961 | Merz | 340—172.5 |

GARETH D. SHAW, Primary Examiner